(12) United States Patent
Endres et al.

(10) Patent No.: US 11,318,716 B2
(45) Date of Patent: May 3, 2022

(54) COMPOSITE CONSTRUCTION FOR AN INCREASED SERVICE LIFE

(71) Applicant: Airbus Operations GmbH, Hamburg (DE)

(72) Inventors: Gregor Christian Endres, Hamburg (DE); Hans-Juergen Weber, Hamburg (DE); Klaus Schoote, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 860 days.

(21) Appl. No.: 15/522,917

(22) PCT Filed: Oct. 27, 2015

(86) PCT No.: PCT/EP2015/074905
§ 371 (c)(1),
(2) Date: Apr. 28, 2017

(87) PCT Pub. No.: WO2016/066657
PCT Pub. Date: May 6, 2016

(65) Prior Publication Data
US 2017/0320290 A1 Nov. 9, 2017

(30) Foreign Application Priority Data
Oct. 31, 2014 (DE) .......................... 102014015976.0

(51) Int. Cl.
*B32B 7/08* (2019.01)
*B29C 70/68* (2006.01)
(Continued)

(52) U.S. Cl.
CPC .............. *B32B 7/08* (2013.01); *B29C 70/086* (2013.01); *B29C 70/24* (2013.01); *B29C 70/68* (2013.01);
(Continued)

(58) Field of Classification Search
None
See application file for complete search history.

(56) References Cited

U.S. PATENT DOCUMENTS 5,624,622 A   4/1997 Boyce et al.
2008/0274491 A1   11/2008 Coles et al.
(Continued)

FOREIGN PATENT DOCUMENTS

DE   102005024408   11/2006
DE   6943917 T2   11/2007
(Continued)

OTHER PUBLICATIONS

Machine translation of WO2010136362, Weber (Year: 2010).*
(Continued)

*Primary Examiner* — Shawn Mckinnon
(74) *Attorney, Agent, or Firm* — Greer, Burns & Crain, Ltd.

(57) ABSTRACT

A composite construction, such as, in particular, a composite plate having a sandwich-type construction, has two outer layers which are mutually opposed in parallel and a foam material completely filling the space between the outer layers at least in some regions. The outer layers are interconnected by means of spacers, and the spacers are connected to the outer layers via a cured plastics material.

20 Claims, 2 Drawing Sheets

(51) Int. Cl.
- B29D 99/00 (2010.01)
- B32B 7/12 (2006.01)
- B32B 37/16 (2006.01)
- B32B 5/24 (2006.01)
- B32B 3/06 (2006.01)
- B32B 3/08 (2006.01)
- B32B 5/06 (2006.01)
- B32B 5/14 (2006.01)
- B29C 70/08 (2006.01)
- B29C 70/24 (2006.01)
- B32B 5/18 (2006.01)
- B29L 31/10 (2006.01)
- B29L 31/30 (2006.01)

(52) U.S. Cl.
CPC .......... *B29D 99/0021* (2013.01); *B32B 3/06* (2013.01); *B32B 3/08* (2013.01); *B32B 5/06* (2013.01); *B32B 5/142* (2013.01); *B32B 5/18* (2013.01); *B32B 5/24* (2013.01); *B32B 7/12* (2013.01); *B32B 37/16* (2013.01); *B29L 2031/10* (2013.01); *B29L 2031/3017* (2013.01); *B29L 2031/3076* (2013.01); *B32B 2250/03* (2013.01); *B32B 2250/40* (2013.01); *B32B 2262/0269* (2013.01); *B32B 2262/101* (2013.01); *B32B 2262/106* (2013.01); *B32B 2266/025* (2013.01); *B32B 2266/0235* (2013.01); *B32B 2266/0264* (2013.01); *B32B 2305/022* (2013.01); *B32B 2305/076* (2013.01); *B32B 2323/00* (2013.01); *B32B 2323/04* (2013.01); *B32B 2327/06* (2013.01); *B32B 2367/00* (2013.01); *B32B 2605/18* (2013.01); *B32B 2607/00* (2013.01); *Y02T 50/40* (2013.01)

(56) References Cited

U.S. PATENT DOCUMENTS

| | | |
|---|---|---|
| 2012/0135180 A1 | 5/2012 | Weber et al. |
| 2013/0266756 A1 | 10/2013 | Zuardy et al. |
| 2013/0330496 A1 | 12/2013 | Kray et al. |

FOREIGN PATENT DOCUMENTS

| | | |
|---|---|---|
| DE | 102009026458 | 12/2010 |
| DE | 102010031688 | 1/2012 |
| EP | 1686210 | 8/2006 |
| WO | 2010136362 | 12/2010 |
| WO | 2011012587 | 2/2011 |
| WO | 2013184491 | 12/2013 |

OTHER PUBLICATIONS

Machine translation of EP1686210, Le Roy (Year: 2006).*
International Search Report, dated Jan. 11, 2016, priority document.
German Office Action, dated Mar. 14, 2107, Priority Document.

* cited by examiner

COMPOSITE CONSTRUCTION FOR AN INCREASED SERVICE LIFE

CROSS-REFERENCES TO RELATED APPLICATIONS

This application claims the benefit of the German patent application No. 10 2014 015 976.0 filed on Oct. 31, 2014, the entire disclosures of which are incorporated herein by way of reference.

FIELD OF THE INVENTION

The invention relates to a composite construction having a sandwich-type construction and to a method for the production thereof.

BACKGROUND OF THE INVENTION

In particular, composite constructions are considered which can be used as floor plates in aircraft construction. Thus, in current modern, civil wide-body aircraft, floor plates are core-composite constructions based on honeycomb structures (phenol-coated aramid paper). These honeycombs are provided on each side with thin face sheets made of glass and/or carbon fibers. For a weight-efficient construction, regions with local load introduction and/or edge regions of the floor plates are optimized by prepreg blocks/core filling materials. The filling materials are highly filled epoxy resins. The materials are pressed into the open honeycomb cells and then cured together with the face sheets. Although this procedure can provide additional local reinforcement, it also results in additional production steps and considerable additional weight. Attachment points (base plate<=>floor grate) are produced by inserts made of metal/composite (torlon) or also by a glass insert component or prepreg plugs (what are known as glass plugs). The former (inserts) are bonded in after the composite is finished and are optionally provided with threads. The latter (prepreg plugs) are cut out of cured fiber composite laminate and inserted and/or bonded in the honeycomb before the application of the face sheets. After the composite is finished, a hole can be made in the insert components.

Provided that various grades of honeycomb (varying in density, cell width and paper) are not additionally bonded to form an ensemble (splice), when selecting the honeycomb, a honeycomb density should be selected which satisfies the required mechanical properties in the x, y and z-directions. It should thus be assumed that the honeycomb to be processed represents a compromise between mechanical properties and an optimum weight.

Possible local damage to the plate can increase as a result of additional dynamic loads, which over time can lead to the formation of planar damage, which is tantamount to a general loss of structure. If the floor plate is to be considered part of the supporting structure, it thus contributes to the stability of the overall aircraft structure, thus a loss of structure of this type can be tolerated to only a limited extent. Furthermore, it is beneficial for the comfort of the passengers to only a limited extent, since increasing damage leads to a "soft" feeling. Such plates are also referred to as "spongy panels."

During regular checks of the entire aircraft, the carpeted floor is also removed from the passenger region. The carpeted floor is bonded directly to the floor plates by means of a special double-sided adhesive tape or dispersion adhesive. When removing the carpet, the attachment of the cover skin, that is to say the outer layer of the floor plate, is also strongly loaded at the honeycomb. The tensile or peeling forces occurring can even cause the attachment to fail, which results in a loss of structure in the plate. This effect becomes even greater, the less resin is available for the attachment.

For reasons of rigidity and weight, floor plates are increasingly provided with carbon-based composite cover skins. The reduction in resin for reasons of cost and weight leads to the formation of cover-skin porosities. Additionally, support is provided in this case by the fact that, when the plates are pressed, only the honeycomb webs and the cover-skin regions located thereon "see" the full pressing force. In the region of the cells, only reduced pressures act on the cover skins. Due to the condensation which is produced in the cabin space, a galvanic bridge can be formed between the C (carbon) fibers and the Al (aluminum) grid of the floor-plate structure (seat rails). Corroding floor supports have a reduced load-bearing capacity.

The bonded insert components, such as, in particular, prepreg plugs and/or blocks, are preferably connected to the cover skins by means of a prepreg resin for the reasons already mentioned above. During the period of use, the cover skin can become detached in this region, which is tantamount to the fact that the attachment of the floor plates to the floor grate is no longer sufficient, which can result in a reduced load-bearing capacity.

Due to the continued demand for weight optimization, thinner cover skins are additionally required on the honeycombs. The adhesive film previously used for connection between honeycombs and cover skins has been replaced with an increased amount of resin in the prepreg for reasons of weight. The uncured skins are bonded to the core structure in a press.

SUMMARY OF THE INVENTION

It is an idea of the invention to provide an improved composite construction which has a high strength and rigidity at a low weight, and which has a long-service life.

A composite construction, such as, in particular, a composite plate having a sandwich-type construction, can comprise two outer layers which are mutually opposed in parallel. In this case, a foam material completely fills the space between the outer layers, at least in some regions. The outer layers are interconnected by means of spacers, and the spacers are connected to the outer layers by means of a cured plastics material. As a result of this, the honeycomb-type intermediate layers can be replaced. Instead of adhesive lines of the honeycombs on the outer layers, there are individual points of adhesive in each case. As a result, crack growth, which frequently occurs in the case of lines of adhesive, is prevented. Since the foam material is a hard, closed-cell foam, environmental conditions (oxygen, moisture) reach the inside of the composite construction to a reduced extent and in a locally restricted manner, and corresponding problems of oxidation and ageing are prevented. By means of a different clustering of the spacer elements and the specific orientations thereof, it is possible to achieve rigidity and strengths which differ from region to region. It is thus possible to make savings in terms of material and weight where the loads are lower.

The spacers can be rod-shaped in the region between the outer layers. This does not exclude the spacers from comprising angled portions or bends adjacent to the outer layers. However, in the intermediate region, the spacers are can be straight, since they can thus absorb tensile or compression forces well. A rod is understood, in particular, to be an element having a constant cross section. In particular, the ratio of the largest diameter to the smallest diameter is less than 2 The spacers can be round or angular. Possible bending is delayed by the foam surrounding the spacers. The spacers can be predominantly straight or unbent in the region between the outer layers. In this way, both tensile and compression forces can be absorbed well.

The individual spacers can be oriented according to a predetermined rule. A desired distance from a positioning machine can thus be predetermined. The spacers are thus not distributed and/or oriented at random. As a result, it is possible firstly to achieve, depending on the loads, a locally varied strength and/or rigidity by means of a greater spacer density and/or secondly to achieve a locally controlled adjustment of the strength and/or rigidity by means of a local orientation of the spacers.

In another embodiment, the outer layers are penetrated at least in part by the spacers. In this way, a good connection of the outer layers to the spacers is achieved.

Alternatively or additionally, the spacers can comprise pointed ends at least in part. In particular, at least 20%, or at least 50%, or virtually all the spacers comprise pointed ends. The point can be achieved in that the spacer is cut to length at an angle of 60°-85° to the cross section of the spacer. This results in the following features: both the outer layer and the foam can thus be pierced better without the spacer being bent. In the cases where the spacer (as described below) rests against the inner face of the outer layers, this is facilitated by the flexibility, which is increased by the decreasing cross section.

The density of the spacers, at least in some regions, can be greater than three spacers per square centimeter and in particular greater than ten spacers per square centimeter. In this way, sufficient stability is provided.

In a portion of the composite construction which is used, in particular, for the fixing thereof or which is located at the edge of the composite construction, the density of the spacers can also be greater than in portions of the composite construction which are remote therefrom. The increase in density in the above-mentioned fixing region or at the edge can be at least 50% with respect to the remaining distribution density.

In particular, in some regions, at least 50%, or at least 80%, of the spacers are oriented between the outer layers in such a way that the angular deviations thereof from the outer layer orthogonals are greater than 15°, the regions, for example, being remote from the portions of the composite construction which are used for the fixing thereof. In some embodiments, none of the spacers in the intermediate region is also oriented in parallel with the plane of the outer layers only in some regions. Virtually all the spacers can be preferably in contact with both outer layers.

In some embodiments, a limited number of orientations is defined for the spacers, and the spacers are oriented in one of these orientations in each case. This is advantageous for loading the composite plate with the spacers. Thus, in one machining tool, in each case one or more orientations can easily be predetermined. This arrangement also simplifies determining the strength in all orientations.

In some embodiments, at least on one portion of the composite construction, which is used for the fixing thereof, the composite construction comprises an insert component or a comparable filler substance which bridges the outer-layer space, at least one of the spacers penetrating the insert component or the filler substance at least in part. A suitable filler substance is any substance which, following an optional filling or curing process, is suitable for absorbing compression forces. By means of the penetration, the connection of the insert—component to the outer layers can be improved, since the spacers in turn are connected to the outer layers.

In a corresponding method for producing a composite construction, firstly an intermediate product comprising two outer layers and a foamed layer located therebetween is produced, and, by penetrating at least one of the outer layers, spacers are introduced into the region located between the outer layers, and subsequently, a plastics material which is located in the outer layers or the spacers or is introduced therein, is cured. Alternatively, in a method for producing a composite construction, a plurality of spacers are introduced for the most part into a foamed layer, and by using outer layers, a sandwich assembly is created, and the spacers are pushed into the outer layers from the inside, or the spacers are attached to an inner face of the outer layers, and, subsequently, a plastics material is cured, and the spacers are thus connected to the outer layers.

In the above-mentioned methods, dry fibers can be used to form the outer layers and/or the spacers. After the formation of the composite construction, the fibers are mixed with the resin by means of an infusion process and cured. Alternatively, to form the outer layers, as well as the spacers, prepreg fibers can be used, which are already mixed with resin, the resin being prevented from curing prematurely by means of curing retardants. Furthermore, combined methods are possible in which on the one side of a composite construction, a dry outer layer, that is to say a layer which is initially not provided with resin, is used, and on the other side, a prepreg fiber board is used to form the outer layer. At least one outer layer, or both outer layers, of the fiber composite construction are prepreg layers or fibers or fiber layers provided with uncured resin, which are cured together with the spacers (20-25).

In particular, a fiber strand or fiber thread which is suitable for a sewing process or a dry reinforcement process is pushed or pulled through a foamed layer or through a foamed layer and at least one outer layer, and subsequently the fiber strand or fiber thread can be mixed with resin and cured. This describes in particular a dry sewing process.

BRIEF DESCRIPTION OF THE DRAWINGS

Various embodiments of the invention are described in greater detail in the following on the basis of schematic views, in which.

DETAILED DESCRIPTION OF THE PREFERRED EMBODIMENTS

Figure 1:
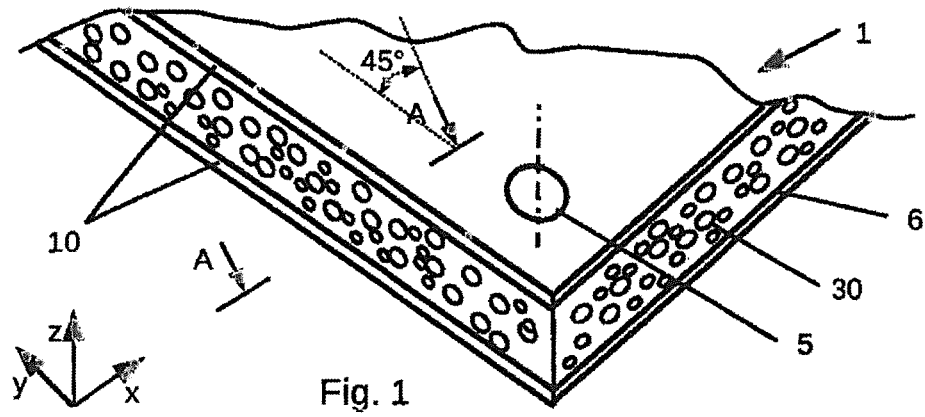
FIG. 1 is a perspective view of a corner of a composite plate.

The composite plate according to FIG. 1 comprises a sandwich construction having two outer layers 10 and a layer 30 made of a foam material 35 therebetween. The outer layers 10, which are also referred to as a cover skin, have a high concentration of fibers, which are connected by means of a synthetic resin to form a mat. The outer layers have, in particular, a regular arrangement of fibers, such as in a woven fabric. An irregular fiber arrangement, such as in a non-woven fabric, is also possible. In addition to the foam material 35, a multiplicity of spacers are also integrated in the intermediate space of both outer layers 10, the spacers not being visible in FIG. 1. The spacers are connected to the outer layers 10 by means of synthetic resin. This results in a sandwich construction, which also has a high strength independently of the foam-material layer located therebetween.

Figure 4:
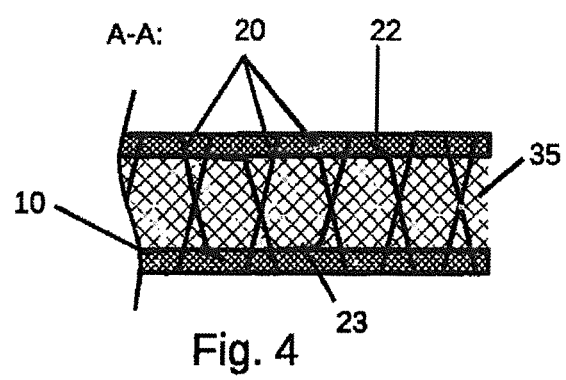
FIG. 4 shows the composite plate from FIG. 1 in the section A-A.

Section A-A from FIG. 1 is shown in FIG. 4. The x-axis is located in the section, and in this case, there is a 45° angle between the sectional plane and the x-y plane. In this context, the spacers 20 and 22 shown in FIG. 4 are positioned obliquely in the composite plate 1. The composite plate 1 can comprise a multiplicity of spacers 20, 22, 23, and therefore similar sectional views are also possible over sections in each case in the x-axis at an angle of −45° to the x-y plane, and a positive and negative 45° orientation to the y-z plane, which go through the y-axis. In alternative embodiments, different arrangements of the spacers are possible, wherein the angular orientation can deviate, and the individual spacers also do not have to be located in separate planes. The spacers can be placed according to a predetermined pattern.

A specific orientation in a specific position can be assigned by the processing machine to each individual spacer. It is also possible to determine an orientation of the spacers which is determined virtually at random by the processing machine.

A plurality of spacers penetrate the outer layers in full (reference sign 20) or in part (reference sign 22). Other spacers 23 rest flat against at least one of the inwardly facing faces of the outer layers 10.

Figure 2:
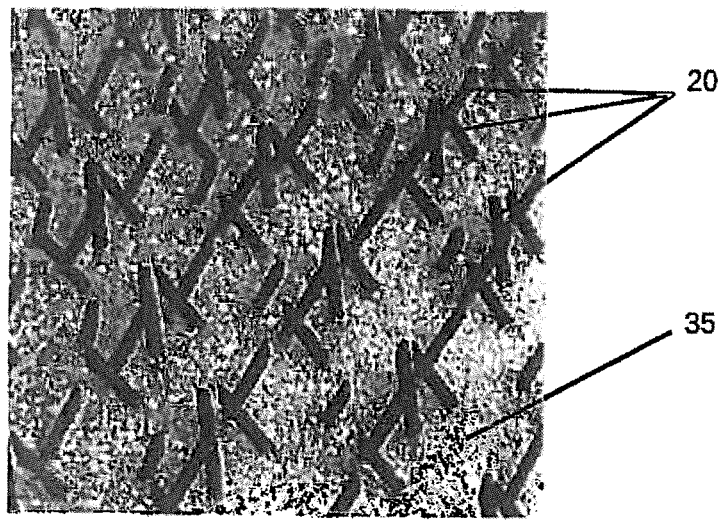
FIG. 2 shows an intermediate stage of the production of a composite plate.

FIG. 2 is a view which corresponds to that in FIG. 4, in which, however, the upper outer layer is not shown. The foam layer 35 is thus shown, and a multiplicity of the spacers 20 protrude upwards out of the foam layer 35. In this case, the spacers 20 have a multiplicity of different angular orientations.

Figure 3:
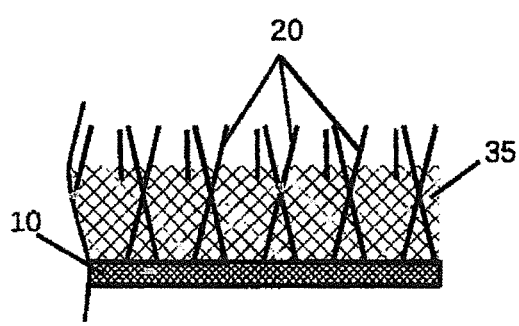
FIG. 3 is a view of the intermediate stage according to FIG. 2.

The construction of the composite plate according to FIG. 4 can be produced in various ways. In a first variant, the inner foam layer 35 is foamed or provided as a semi-finished product, and a lower outer layer 10 is optionally placed thereunder. Subsequently, in an automatic process, a multiplicity of spacers 20 are pushed or injected into the foam. This results in the intermediate stage which is shown in FIG. 3. In the intermediate stage, although the spacers are received in the foam material 35, they still do not penetrate into the lower outer layer 10.

In the next step, the second layer is placed on from above and is pressed together with the intermediate stage in such a way that the second outer layer comes into contact with the foam material 35. In this pressing process, some of the spacers press into the upper outer layer, and other spacers press into the lower outer layer, thus resulting in the construction shown in FIG. 4. Alternatively, an intermediate stage can also be produced with a foam layer, from which the spacers protrude on both sides, and an outer layer is subsequently placed on both sides.

Figure 5:
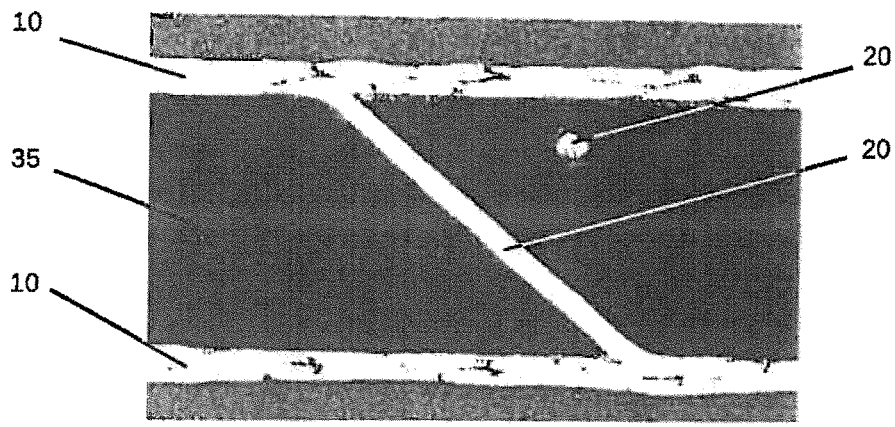
FIG. 5 is a photo of a section through the composite plate.

FIG. 5 shows an image of a spacer 20 which is in contact with both outer layers 10. In this case, the spacer 20 does not pierce through the outer layers 10, but rather rests against the inner contour of the outer layers between the foam material 35 and the outer layers 10. In addition, another spacer 20 is shown which is at an angle of approximately 90° to the first-mentioned spacer and penetrates the image plane.

In an alternative method for producing the composite plate 1, the sandwich construction comprising the foam material 35 and the two outer layers 10 can firstly be produced without the connecting spacers 20. In a subsequent production step, the spacers 20 are introduced through the material of one of the outer layers 10 into the sandwich construction in such a way that the individual spacers are each in contact with both outer layers 10. Provided that, during the introduction thereof, the spacers 10 are not guided sufficiently by a guiding element, the spacers have a sufficient strength and flexural rigidity for the insertion to take place without any buckling or bending.

Figure 6:
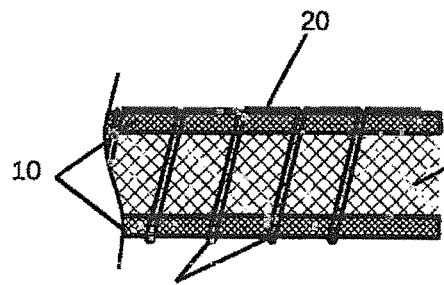
FIG. 6 shows a variant of the composite plate comprising sewing technology.

FIG. 6 shows an additional variant in which a sewing process is used. In this case, the spacer 20 has a thread-like flexibility so that it can be guided through the sandwich packing by a needle (not shown). On the lower face, the spacer is interwoven with a lower thread 28 so that the loops shown are produced when the needle is pulled back. Double-locked stitches or double-chain stitches or also modified knotting techniques can be used, in particular, as the sewing process.

Figure 8:
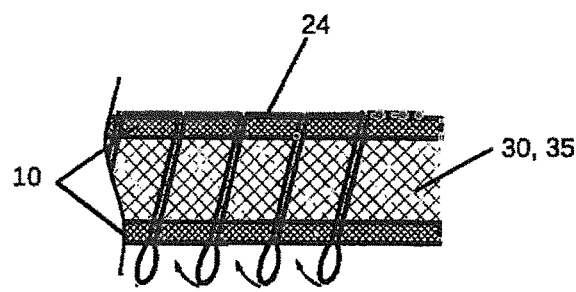
FIGS. 8 and 9 show two different methods for forming loops or sewing.

FIG. 8 shows a sewing process in an intermediate stage, in which loops are formed on one side of the composite construction. This process is also referred to as tufting. In a processing step which is not shown, but is indicated by the arrows, the loops are folded over and thus form part of the outer face of the composite construction. Since the curing results in a sufficient rigidity of the spacers 20, it is not absolutely necessary to use a conventional sewing process, such as shown for example in FIG. 9.

Figure 9:
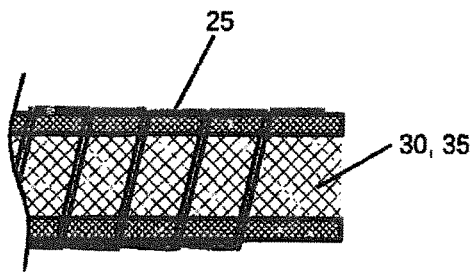

In the sewing process according to FIG. 9, processing is carried out using a one-sided thread, which is guided on one side of the composite construction and, on the opposite side, is guided in the manner of a loop to penetrate the adjacent loop and is sewn up there.

Figure 7:
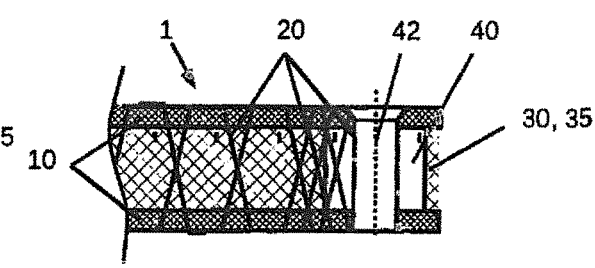
FIG. 7 is a schematic view for illustrating an insert component.

FIG. 7 shows an optional insert component 40. The component has a central hole 42, which goes through the entire composite plate 1. The hole is chamfered on one side and is used to fix the composite plate, for example by means of a screw connection. Since, when using a screw connection, high compression forces occur on the outer face of the composite plate, particular compressive rigidity is required here. This is made possible by the insert component 40. The insert component initially comprises a stack of a multiplicity of layers of glass cloth, for example more than 20 layers. These layers can be dry, that is to say are not permeated by resin and, in the steps described below of wetting and curing, become a hard insert component which can absorb the above-mentioned forces. Since there is still no resin in the insert component, or the resin contained therein is not cured, the insert component can be penetrated by the spacers without any particular resistance. Since, before the plastics material is used, the stack is not particularly hard, it is possible for the spacers to penetrate the stack of glass-fiber layers. Furthermore, in FIG. 7, it can be seen that the density of the spacers in the surroundings of the insert component is increased. As a result, forces which result when fixing the composite plate can also be absorbed in a targeted manner. If the cover skins, that is to say the outer layers, are also penetrated in addition to the layers of the insert component, then the bonding strength of the composite as a whole is additionally increased in this region.

In an alternative embodiment, it is not necessary to use a separate insert component for the fixing region of the composite plate 1. Instead, the density of the spacers there can be increased in such a way that the fixing forces can be absorbed well. In this case, the spacers can be installed not at oblique angles (such as at an angle of from 40° to 80° to the normal of the composite plates), but can rather be installed perpendicularly to the plane of the composite plates.

In each of the above-mentioned embodiments, the spacers can be produced by means of rovings. A roving is a bundle of fibers comprising a multiplicity of individual fibers. In the case of a carbon-fiber roving, for example 1000 or more individual fibers (filaments) can be used. The diameter of the spacers can vary greatly from the operating conditions. Spacers having diameters in the range of from 0.5 mm$^2$ to 3 mm$^2$ can be used. In the applications in which sewing is carried out, the smaller cross sections can be used. If the spacers are inserted through one of the outer layers in such a way that the inherent rigidity of the spacers is substantial, then the larger cross sections are used instead.

Each of the embodiments described above can be produced in principle using both moist and dry fibers. B-stage fibers or fiber bundles can also be used. These are fibers saturated with resin which have been partially cured in an earlier method step. By means of the partial curing, the fibers have lost the majority of the tackiness thereof. As a result of the temperature conditions of the curing, the resin of the B-stage material is liquefied, resulting in good adhesion. Moist fibers are also referred to as prepregs. In this case, the spacers, that is to say, in particular, the rovings, are already saturated or impregnated with resin. By means of reaction retardants, the cross-linking reaction is prevented from starting prematurely. In fact, the reaction can be started after the production of the component in particular by supplying heat. In this context, the dry fibers are not mixed with the resin.

Instead, the fibers are mixed with the resin after the production of the above-described composite plate and subsequently cured. Combined methods are also possible, wherein dry fibers are used for a first side, and prepregs are used for the other side of the composite plate. The use of prepregs can be advantageous, in particular, when, on an inner side of the composite plate which is being installed, a lower saturation of resin is sufficient, and, for example, a sewing process using dry fibers can be better carried out, and, in the case of the outer side of the composite plate being used, a higher saturation of resin improves the strength properties.

In addition to the use of infusion processes according to the prior art (VAP, MVI, RTM, etc.), due to the high number of components required, a pultrusion infusion is conceivable in this case. The pultrusion process is a continuous process of producing material, in which firstly, as described above, a sandwich construction provided with spacers is created. Subsequently, the construction is in a closed space, which it passes through, for example, under vacuum provided with the synthetic resin, which is subsequently heated, for example, under vacuum and thus cured. During the curing process, presses or rollers ensure that the composite plate produced in this way is dimensionally stable, in particular, in terms of the thickness thereof.

When the prepreg has a sufficient resin content, dry reinforcements can also be impregnated with resin. Due to the height of the components, an infusion step of this type can be replaced by the use of prepregs. When using presses, the production costs decrease considerably. It is also possible to combine a pure resin film with prepreg face sheets.

The foam 35 is a defined, low, fine and/or closed-cell foam which can have a uniform density. Polyurethane foams are suitable for this purpose, since they have a high hardness. Furthermore, in particular polyvinyl chloride (PVC), polypropylene (PP), polyethylene (PE), polyethylene terephthalate (PET), polybutylene terephthalate (PBT), polystyrene (PS), expanded polystyrene (EPS) or cross-linked polystyrene (XPS) foams are suitable. A closed-cell foam can be used to prevent the foam being filled with the resin, which also increases the component weight in addition to the material costs. The foam can have a strength such that it can absorb between 10 and 50% of the compression stresses which are exerted on the composite construction. Tensile stresses, that is to say, forces which would bring about the separation of the composite construction, and shear forces (in the x-y plane according to FIG. 1) are absorbed by the spacers.

Epoxy resin or a resin based on vinyl ester or the like can be used as the resin.

The thickness of the composite plate can be for example, 10 mm. The thickness of the outer layers is shown schematically in the drawings and in this case is in particular exaggerated. The outer layers can be less than 1 mm thick (for example 0.5 mm) and/or can have, for example, a weight of 200 g/m$^2$. The fiber material of the outer layers can comprise the same fibers as the spacers.

Bundles of carbon fibers, glass fibers, aramid fibers or the like can be used as the material for the spacers. These fibers have, in particular, sufficient flexibility such that they are able to be bent, as is necessary during sewing. When the fibers (as described) are inserted through the foam, a sufficient stability is advantageous. Partially cured or cured fiber rods or pegs made of metal or the like can also be used. The use of the rods or pegs is advantageous, in particular, when the spacers are to be introduced after the creation of the sandwich construction. If peg-type spacers are inserted through the foam, they can also be cut to length in such a way that they stick out of the foam slightly (depending on the application, on one or both sides). They can then be folded over or bent in a separate work step so that the contact surface is enlarged for subsequent contact with the outer layers.

Using the foam material as a support has various advantages. Since the cells are very small by comparison with the honeycomb structures known from the prior art and are additionally closed, the edge is already sealed against penetrating moisture. Other than an optionally provided increase in the density of the spacers, no particular insert or other treatment is required at the edge.

Pin-reinforced structures demonstrably have outstanding damage tolerance. Any damage, once introduced, is absolutely spatially restricted and also is not enlarged further as a result of the tear-stopping effect of the intact pins. In already known embodiments of composite plates, a honeycomb structure bonded to the outer plates was in the intermediate layer. When these bondings are torn in some regions, the tear could continue due to the stress peaks at the end of the tear. However, spacer elements, which are also referred to as pins, are to be considered to be singular elements. As a result, they can be freely distributed and individually oriented in the face. It is thus possible carry out configuration, by means of a controlled distribution and orientation of the spacer elements, according to requirements. This is a very efficient method for configuring load introductions, edge reinforcements, etc.

In addition, the foam material can be used for thermal and acoustic insulation and thus ideally replace additional elements.

In summary, it can be said that foam materials reinforced in this way are an interesting alternative to existing honeycomb constructions. With respect to a weight-optimized construction, this category of materials offers great potential. Force transmissions, edge reinforcements etc. can easily be configured. By means of the very good impact behavior thereof, the risk of growing damaged areas is minimized. An optimized face sheet attachment additionally reduces the scale of damage that occurs. Foam materials reinforced according to the invention thus offer considerable potential for longer component service lives. In addition, by modifying the pin density, further increasing future demands on the composite plates, for example from anchoring additional elements (e.g., kitchen, toilets, etc.) can also easily be counteracted.

Composite constructions have been described above with reference to the use thereof as floor plates in aircraft. In general, for the composite constructions, there are additionally many fields of application in uses in which a high load-bearing capacity and a low weight are required. These can be walls in aircraft as well as cover elements. In addition, the use thereof in trains and ships is particularly advantageous. The plates do not have to be planar, but rather can be curved or bent. Furthermore, the thickness of the composite construction does not have to be constant in order to be able to produce three-dimensional structures comprising stable outer faces which each achieve increased strength against various stresses by means of spacers.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 1 composite plate, composite construction
5 fixing region
6 edge of the composite plate
10 outer layer
20, 21, 22, 23, 24, 25 spacers
28 lower thread
30 intermediate layer
35 foam material
40 insert component
42 hole

The invention claimed is:

1. A composite plate having a sandwich-type construction, comprising:
two outer layers which are mutually opposed in parallel,
a foam material completely filling the space between the outer layers, at least in some regions, wherein
the outer layers are interconnected by means of spacers, and
the spacers are connected to the outer layers via a cured plastics material,
wherein a first plurality of the spacers completely penetrate at least one of the outer layers,
wherein a second plurality of the spaced partially penetrate the at least one of the outer layers, and
wherein a third plurality of spacers lie flat against an inner face of the at least one of the outer layers.

2. The composite plate of claim 1, wherein the spacers in the region between the outer layers are rod-shaped.

3. The composite plate of claim 2, wherein the spacers in the region between the outer layers bridge the space between the outer layers in a largely unbent manner.

4. The composite plate of claim 1, wherein at least one of the position and the orientation of the individual spacers is determined according to a predetermined rule.

5. The composite plate of claim 1, wherein the spacers comprise pointed ends at least in part.

6. The composite plate of claim 1, wherein the density of the spacers, at least in some regions, is greater than three spacers per square centimeter.

7. The composite plate of claim 6, wherein the density of the spacers, at least in some regions, is greater than ten spacers per square centimeter.

8. The composite plate of claim 1, wherein at least in one portion of the composite plate the density of the spacers is greater than in portions of the composite plate which are remote therefrom.

9. The composite plate of claim 8, wherein said at least one portion of the composite plate is used for the fixing thereof.

10. The composite plate of claim 1, wherein in some regions, at least 50% of the spacers are oriented between the outer layers in such a way that the angular deviations thereof from the outer layer orthogonals are greater than 15°.

11. The composite plate of claim 10, wherein said some regions are remote from the portions of the composite plate which are used for the fixing thereof.

12. The composite plate of claim 1, wherein, for the spacers, a limited number of orientations is defined, and the spacers are oriented in one of these orientations in each case.

13. The composite plate of claim 1, wherein at least on one portion of the composite plate, which is used for the fixing thereof, the composite plate comprises an insert component bridging the outer-layer space or a comparable filler substance, at least one of the spacers penetrating at least one of the insert component and the filler substance, at least in part.

14. A method for producing a composite plate, comprising the steps:
creating, firstly, an intermediate product comprising two outer layers and a foamed layer located therebetween, and,
introducing spacers into the region located between the outer layers by means of a penetration of at least one of the outer layers, and subsequently,
curing a plastics material which is located in at least one of the outer layers and the spacers
wherein a first plurality of the spacers completely penetrate at least one of the outer layers,
wherein a second plurality of the spaced partially penetrate the at least one of the outer layers, and
wherein a third plurality of spacers lie flat against an inner face of the at least one of the outer layers.

15. The method of claim 14, wherein at least one of a fiber strand and a fiber thread which is suitable for at least one of a sewing process and a dry reinforcement process is pushed or pulled through either a foamed layer or a foamed layer and at least one outer layer, then the fiber strand or fiber thread is mixed with resin and cured.

16. The method of claim 14, wherein at least one outer layer of the fiber composite plate are fibers or fiber layers provided with prepreg layers or with uncured resin, which are cured together with the spacers.

17. A method for producing a composite plate, comprising the steps:
  introducing a plurality of spacers, at least mostly, into a foamed layer, wherein by using outer layers, a sandwich assembly is produced, and
  pushing or pulling the spacers into the outer layers, or attaching the spacers to an inner face of the outer layers, and wherein, subsequently,
  curing a plastics material which is located in at least one of the outer layers and the spacers to connect the spacers to the outer layers
  wherein a first plurality of the spacers completely penetrate at least one of the outer layers,
  wherein a second plurality of the spaced partially penetrate the at least one of the outer layers, and
  wherein a third plurality of spacers lie flat against an inner face of the at least one of the outer layers.

18. The method of claim 17, wherein at least one of a fiber strand and a fiber thread which is suitable for at least one of a sewing process and a dry reinforcement process is pushed or pulled through either a foamed layer or a foamed layer and at least one outer layer, then the fiber strand or fiber thread is mixed with resin and cured.

19. The method of claim 17, wherein at least one outer layer of the fiber composite plate are fibers or fiber layers provided with prepreg layers or with uncured resin, which are cured together with the spacers.

20. The composite plate of claim 8, wherein said one portion of the composite plate is located at an edge of the composite plate.

* * * * *